J. W. HODGES.
Steam-Traps.
No. 153,825.
Patented Aug. 4, 1874.
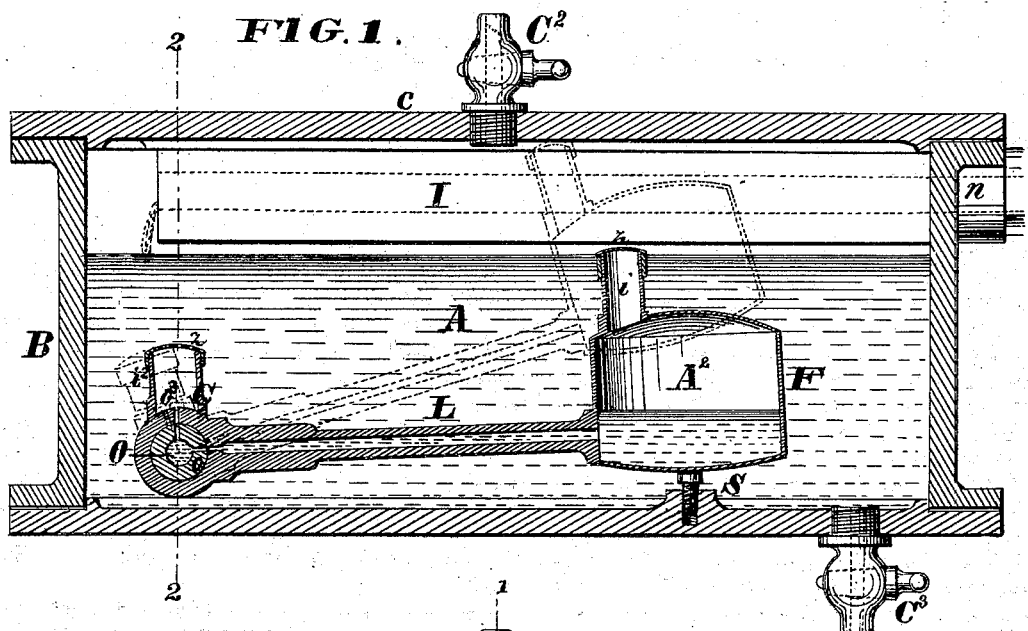
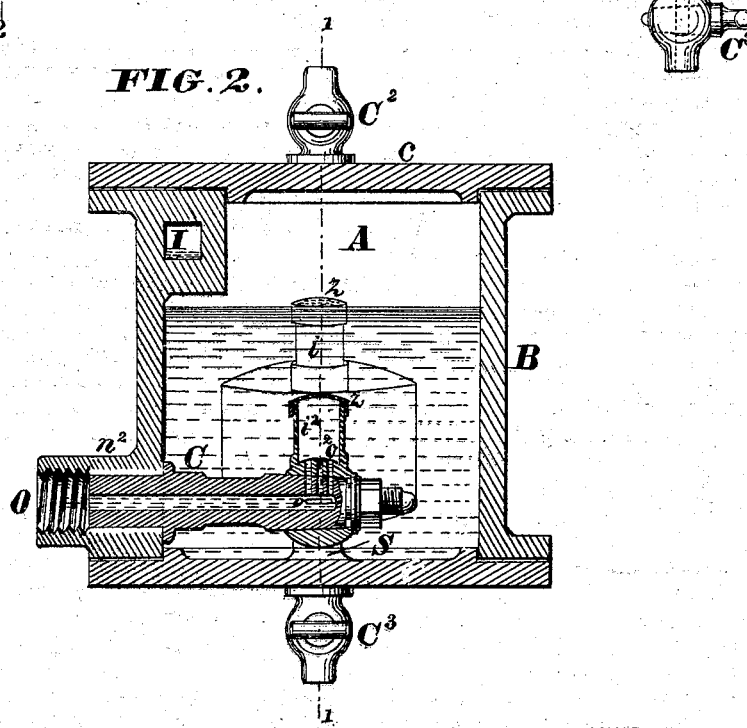
WITNESSES
INVENTOR
James Wilson Hodges
By Knight Bro. Attorneys

UNITED STATES PATENT OFFICE.

JAMES W. HODGES, OF NEW YORK, N. Y., ASSIGNOR OF ONE-THIRD INTEREST TO JOHN W. HARWAY, OF SAME PLACE.

IMPROVEMENT IN STEAM-TRAPS.

Specification forming part of Letters Patent No. 153,825, dated August 4, 1874; application filed February 26, 1874.

*To all whom it may concern:*

Be it known that I, JAMES WILSON HODGES, of the city, county, and State of New York, have invented an Improved Steam-Trap, of which the following is a specification:

This invention relates to a form of steam-trap which is not in common or general public use, the same consisting, essentially, of a box or chest with inlet and outlet passages, a horizontal cock communicating with the latter, and in a supplemental port or series of ports in the discharge-cock for the escape of water outside of the float, the same being surmounted by a vertical tube, so that the water shall not escape below a certain level. The invention consists, secondly, in the combination of a tubular float-inlet and external supplemental outlet-ports, so that the water of condensation shall have a very free discharge, while the escape of steam shall be precluded. The invention consists, thirdly, in a main inlet pipe or channel extending to the rear end of the box or chest, so that the entering water shall not interfere with the rise of the float.

Figure 1 is a vertical longitudinal section of a steam-trap in operation, illustrating this invention. Fig. 2 is a vertical transverse section of the same on the line 2 2, Fig. 1. The line 1 1, Fig. 2, indicates the plane of Fig. 1.

In the drawing, B represents a steam and water tight box or chest, which may be made of cast-iron or other suitable material, and of any preferred form. $c$ represents a removable cap, by which access may be had to the interior; $n$, an inlet-neck, and $n^2$ an outlet-neck. C represents a horizontal cock applied to the outlet-orifice within the chest B; and F represents an open float having a hollow lever-arm, L, attached to the moving member of the cock C, so that the latter shall form a pivot for the float, and that communication with the float shall be opened through the lever in the depressed position of the float, as in the illustration. $C^2$ represents a cock applied to the upper part of the chest B to provide for the escape of air. A represents the main chamber of the trap; I, the main inlet; O, the main outlet, and $A^2$ the chamber within the float F. $i$ represents an inlet-tube applied to the float F to form its opening, and arranged to project above the level of the top of the float when the latter is in depressed condition. $z$ represents a sieve applied to the mouth of this tube to prevent the passage of any obstruction which may have obtained entrance to the main chamber. $o$ represents a pair of outlet-ports in the cock C to open communication between the chamber $A^2$ in the float F and the main outlet O. $o^2$ represents a pair of supplemental outlet-ports, which simultaneously open direct communication between the main chamber A and the outlet. $C^3$ represents a supplemental discharge-cock applied to the bottom of the chest B.

The body and top of the float F, with the tube $i$ thereon, are, preferably, formed in one piece, from copper or other suitable sheet metal, by a swaging process, and in this case the sieve $z$ is formed by minute perforations. The float may be cylindrical or of other approved form.

The inlet-tube is, preferably, arranged so as not to render necessary any additional height of chest for its accommodation. In a trap of ordinary proportions this may be accomplished, as in the illustration, by arranging a vertical tube at the inner edge of the float.

The float may be arrested and supported by an adjustable post, S, consisting of a vertical screw in a hollow stud, as in the illustration; or the cock may be so adjusted that the float shall rest on the bottom of the chamber.

The cock C in the illustration is composed of a fixed conical plug and an oscillating sleeve with a nut and washer for securing the latter from displacement; but this particular construction is not essential.

The ports are necessarily formed in the shape of narrow longitudinal slits, as illustrated at $o$, or series of small holes, as illustrated at $o^2$; but either form may be adopted to the exclusion of the other. The external outlet-ports $o^2$ are surmounted by a tube, $i^2$, similar to the tube $i$, so that the water shall not escape therethrough or fall in the chamber A during the operation below a given line. The ports may be formed in any preferred part of the cock.

The inlet I is formed by a cored channel or pipe extending to the rear end of the chamber over the cock C.

The cocks $C^2$ $C^3$ and other details may be of any preferred form and construction.

In setting up the apparatus the steam-pipe is coupled to the inlet-neck $n$, and a discharge-pipe may be coupled to the outlet-neck $n^2$, and the cock $C^3$ may be made to communicate with the discharge-pipe.

When the chamber A is empty the float F lies in the bottom of the chamber, and the outlet-ports $o$ $o^2$ in the cock C are open, as shown in full lines in Fig. 1. The water of condensation enters the trap through the inlet I, and when it reaches a given level the float begins to rise, and in so doing closes the outlet-ports. The float continues to rise with the water in the chamber A until it is arrested at the top of the chamber, as shown in dotted lines in Fig. 1. The cock $C^2$ may now or previously be opened for the escape of air, and at intervals during the use of the apparatus it may be advisable to free the chamber A from air by this means. When the water reaches the top of the chamber A it flows into the float through the tube $i$, and when a sufficient quantity has entered the float-chamber $A^2$ the float sinks to the bottom and reopens the cock C. The water now flows from the chamber A through the tube $i$, float-chamber $A^2$, tubular lever L, ports $o$, and outlet O, and more directly through the tube $i^2$, supplemental ports $o^2$, and outlet O. When the water in the chamber falls below the mouth of the tube $i$ the water continues to flow from the float-chamber $A^2$ until it reaches a certain level, illustrated in Fig. 1. The float then rises again and closes the outlet-ports, and the operation, as above described, is repeated, and so on indefinitely.

Owing to the provision of the tube $i$, the float will rise while the water is still above it. Thus, with a comparatively small float, the required movement of the valve can be accomplished, the float operating also with increased power. Consequently a smaller float and a smaller trap may be employed for a given quantity of work. The trap is thus rendered, relatively, more durable, cheaper, and more convenient for employment.

The supplemental outlet-ports $o^2$ give automatic escape to the water in the event of any obstruction to the inclosed ports, besides increasing the area of opening incident to a given fall of the float, and vice versa.

The extended inlet prevents the entering water from interfering with the rise of the float, as before set forth.

By the cock $C^3$ the water may be drawn off to prevent freezing or to clean the trap, or temporary escape may thus be provided in the event of the other ports becoming obstructed.

I am aware that an open float forming the means and channel of discharge in a steam-trap is shown and described in the expired patent of Guild and Brown, dated May 20, 1851. This feature of the present device is not, therefore, broadly claimed as novel in this invention.

The following is claimed as new, namely:

1. The combination of the open float F, having the inlet-tube $i$, and the cock C, having the ports $o$ and supplemental external ports $o^2$, substantially as specified.

2. In combination with the open float F, the outlet-cock C, located at or near the bottom of the water-chamber A, and constructed with the ports $o$ communicating with the float, and with the supplemental outlet-ports $o^2$ communicating directly with the chamber A, substantially as specified.

3. In combination with the open float F and outlet-cock C, arranged within the chamber A in the manner described, the inlet tube or channel I, extended to the rear or outlet end of the chamber, so as not to interfere with the rise of the float, as specified.

4. In combination with the open float F, outlet-cock C, and main and supplemental outlet-ports $o$ $o^2$ in the latter, the tube $i^2$, surmounting the supplemental outlet-port, as and for the purpose set forth.

JAMES WILSON HODGES.

Witnesses:
 WILLIAM H. ANDREWS,
 HORACE ANDREWS.